(12) United States Patent
Ponnathpur

(10) Patent No.: US 9,206,723 B2
(45) Date of Patent: *Dec. 8, 2015

(54) $NH_3$ EMISSIONS MANAGEMENT IN A $NO_X$ REDUCTION SYSTEM

(71) Applicant: Cummins Emission Solutions, Inc.

(72) Inventor: Chetan Ponnathpur, Columbus, IN (US)

(73) Assignee: CUMMINS EMISSION SOLUTIONS INC., Columbus, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/141,069

(22) Filed: Dec. 26, 2013

(65) Prior Publication Data

US 2014/0102080 A1    Apr. 17, 2014

Related U.S. Application Data

(63) Continuation of application No. 13/204,181, filed on Aug. 5, 2011, now Pat. No. 8,627,651.

(51) Int. Cl.
*F01N 3/00* (2006.01)
*F01N 3/18* (2006.01)
(Continued)

(52) U.S. Cl.
CPC ........... *F01N 3/18* (2013.01); *F01N 3/2066* (2013.01); *F02D 41/0275* (2013.01); *F02D 41/1446* (2013.01); *F01N 3/035* (2013.01); *F02D 2041/1468* (2013.01); *Y02T 10/24* (2013.01)

(58) Field of Classification Search
USPC .......... 60/274, 277, 286, 295, 297, 301, 303, 60/311
See application file for complete search history.

(56) References Cited

U.S. PATENT DOCUMENTS 6,311,484 B1  11/2001 Roth et al.
6,415,602 B1   7/2002 Patchett et al.
(Continued)

FOREIGN PATENT DOCUMENTS

DE  10 2005 031720   1/2007
DE  10 2009 044546   5/2010
GB     2 448 993 A  11/2008

OTHER PUBLICATIONS

European Search Report for European Patent Application No. 12275115.9, mailed Oct. 13, 2013, 5 pages.

(Continued)

*Primary Examiner* — Binh Q Tran
(74) *Attorney, Agent, or Firm* — Foley & Lardner LLP

(57) ABSTRACT

A system includes an internal combustion engine producing an exhaust gas, an aftertreatment system receiving the exhaust gas, the aftertreatment system including a particulate filter positioned upstream of an SCR catalyst component, and a urea injector operatively coupled to the aftertreatment system at a position upstream of the SCR catalyst component. The system further includes a controller that interprets an exhaust temperature value, an ambient temperature value, and a urea injection amount. The controller determines a urea deposit amount in response to the exhaust temperature value, the ambient temperature value, and the urea injection amount, and initiates a desoot regeneration event in response to the urea deposit amount. The desoot regeneration event includes operating the engine at a urea decomposition exhaust temperature.

25 Claims, 2 Drawing Sheets

(51) Int. Cl.
  *F01N 3/20* (2006.01)
  *F02D 41/02* (2006.01)
  *F02D 41/14* (2006.01)
  *F01N 3/035* (2006.01)

(56) References Cited

U.S. PATENT DOCUMENTS

| | | | |
|---|---|---|---|
| 6,442,932 | B1 | 9/2002 | Hofmann et al. |
| 6,532,736 | B2 | 3/2003 | Hammerle et al. |
| 6,662,553 | B2 | 12/2003 | Patchett et al. |
| 6,882,929 | B2 | 4/2005 | Liang et al. |
| 6,981,368 | B2 | 1/2006 | van Nieuwstadt et al. |
| 6,993,900 | B2 | 2/2006 | Upadhyay et al. |
| 7,418,957 | B2 * | 9/2008 | Abe ................. 123/697 |
| 7,765,798 | B2 * | 8/2010 | Bruck ............... 60/286 |
| 8,171,724 | B2 * | 5/2012 | Xu et al. ........... 60/295 |
| 8,209,964 | B2 * | 7/2012 | Kesse ............... 60/295 |
| 8,387,371 | B2 * | 3/2013 | Zhang et al. ..... 60/295 |
| 8,413,432 | B2 * | 4/2013 | Mullins et al. ... 60/295 |
| 8,640,448 | B2 * | 2/2014 | Geveci et al. .... 60/301 |
| 2004/0098974 | A1 | 5/2004 | Nieuwstadt et al. |
| 2006/0263285 | A1 | 11/2006 | Pollington et al. |
| 2007/0044456 | A1 | 3/2007 | Upadhyay et al. |
| 2007/0068142 | A1 | 3/2007 | Robel et al. |
| 2007/0144153 | A1 | 6/2007 | Gandhi et al. |
| 2007/0193254 | A1 | 8/2007 | Johannes |
| 2008/0103684 | A1 | 5/2008 | Allmer et al. |
| 2008/0202097 | A1 | 8/2008 | Driscoll et al. |
| 2008/0271440 | A1 | 11/2008 | Xu et al. |
| 2009/0056315 | A1 | 3/2009 | Solbrig et al. |
| 2009/0288394 | A1 | 11/2009 | Kesse et al. |
| 2010/0024397 | A1 | 2/2010 | Chi et al. |
| 2010/0058740 | A1 | 3/2010 | Kurtz |
| 2010/0071354 | A1 | 3/2010 | Brahma |
| 2010/0122525 | A1 | 5/2010 | Fujita et al. |
| 2011/0030343 | A1 | 2/2011 | Kiser et al. |

OTHER PUBLICATIONS

First Examination Report issued by the European Patent Office for European Patent Application No. 12275115.9, dated Feb. 17, 2015.

* cited by examiner

NH₃ EMISSIONS MANAGEMENT IN A NO$_X$ REDUCTION SYSTEM

CROSS REFERENCE TO RELATED PATENT APPLICATIONS

This application is a continuation of U.S. patent application Ser. No. 13/204,181, filed Aug. 5, 2011, the contents of which incorporated herein by reference in its entirety.

BACKGROUND

The technical field generally relates to control of NO$_x$ reduction systems to minimize the amount of slip of NH$_3$ from the system. A common NO$_x$ reduction system includes a selective catalytic reduction (SCR) system using urea as the reductant. Certain applications that inject reductant into cool exhaust gas experience deposits in the exhaust pipe. Upon a subsequent heating operation, the deposits can clear resulting in NH$_3$ emission spikes. When the heating is rapid and to a high temperature, for example in a soot oxidation operation for a particulate filter, the resulting NH$_3$ emissions can be greater. Further, rapid heating on an engine exhaust system can cause the release of stored NH$_3$ from the SCR catalyst into the exhaust stream. Certain applications include NO$_x$ determination that includes a cross-sensitivity to NH$_3$, such that a large NH$_3$ slip can be mis-diagnosed as a large NO$_x$ emissions event. Therefore, further technological developments are desirable in this area.

SUMMARY

One embodiment is a unique method to remove urea deposits from an engine exhaust system without causing excessive NH$_3$ slip. Further embodiments, forms, objects, features, advantages, aspects, and benefits shall become apparent from the following description and drawings.

DESCRIPTION OF THE ILLUSTRATIVE EMBODIMENTS

Figure 1:
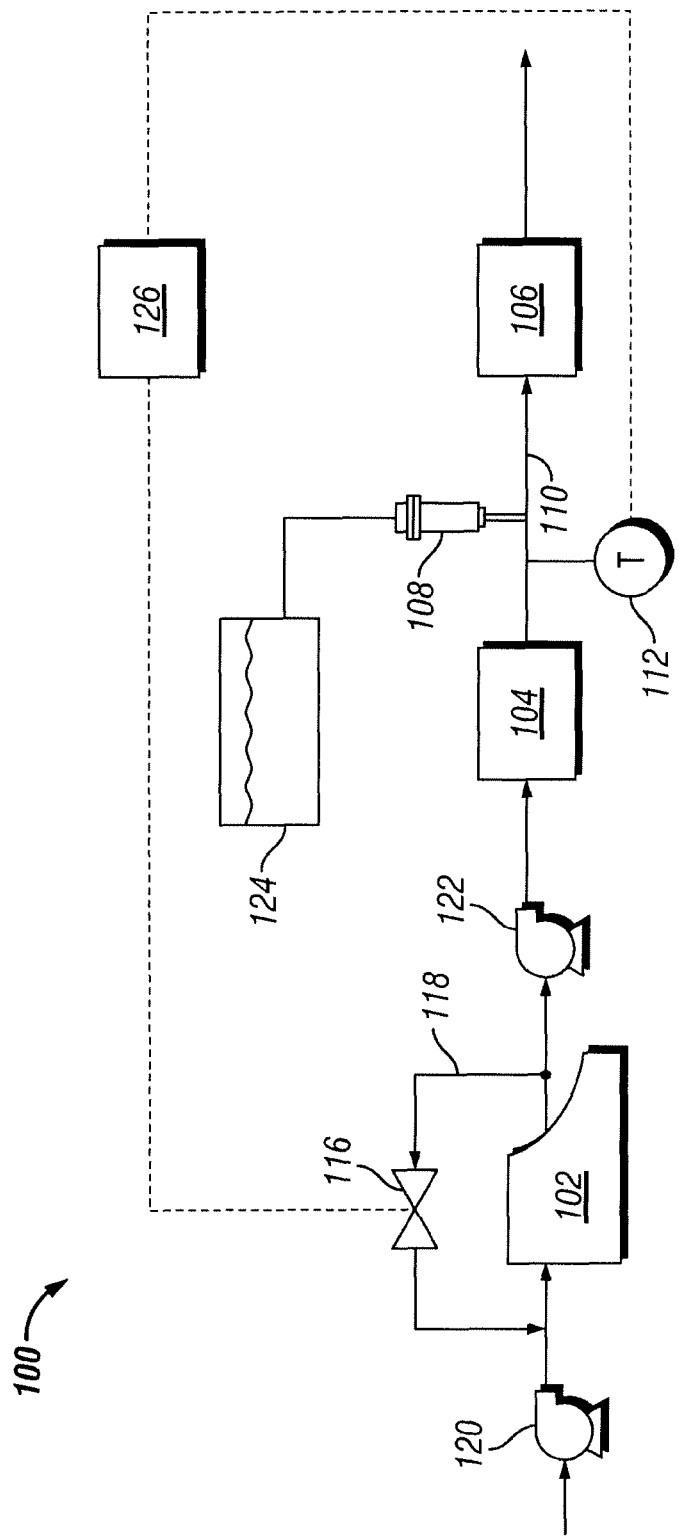
FIG. 1 is a schematic block diagram of a system for NH$_3$ emissions management.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

FIG. 1 is a schematic block diagram of a system 100 for NH$_3$ emissions management. The system 100 includes an internal combustion engine 102 producing an exhaust gas and an aftertreatment system receiving the exhaust gas. The aftertreatment system in the system 100 includes a particulate filter 104 positioned upstream of an SCR catalyst component 106, and a urea injector 108 operatively coupled to the aftertreatment system at a position upstream of the SCR catalyst component 106. The urea injector 108 receives urea from a storage tank 124 in the example, and injects urea upstream of a decomposition tube 110, which is a portion of the exhaust stream that provides residence time for injected urea to evaporate and hydrolyze into NH$_3$.

The exemplary system 100 includes an exhaust gas recirculation (EGR) flow path 118 that returns a portion of exhaust gases from the exhaust stream to an intake side of the engine. In the example of FIG. 1, the EGR flow path 118 flows from a position upstream of a turbine side 122 of a turbocharger to a position downstream of a compressor side 120 of the turbocharger. Thus the exemplary system 100 includes a high-pressure EGR loop, although a system 100 may include a low-pressure EGR loop, or EGR may not be present in certain embodiments. The EGR flow path 118 includes an EGR valve 116 that modulates a flow restriction in the EGR flow path 118.

A temperature sensor 112 is illustrated at a position near the urea injector 108, although a temperature sensor 112 may be positioned anywhere within the system 100, or a temperature may be estimated from other parameters in the system 100 without a temperature sensor 112. In certain embodiments, the system 100 includes a device for determining an ambient air temperature, for example a temperature sensor 112 positioned remotely from the engine 102 or exhaust stream. The determination of an ambient air temperature is well understood in the art, and any device to determine an ambient air temperature is contemplated herein for embodiments utilizing an ambient air temperature value.

In certain embodiments, the system 100 further includes a controller 126 that performs certain operations to limit NH$_3$ emissions in a NO$_x$ control aftertreatment system. In certain embodiments, the controller 126 forms a portion of a processing subsystem including one or more computing devices having memory, processing, and communication hardware. The controller 126 may be a single device or a distributed device, and the functions of the controller 126 may be performed by hardware or software.

In certain embodiments, the controller 126 includes one or more modules structured to functionally execute the operations of the controller 126. In certain embodiments, the controller 126 includes an an exhaust conditions module that interprets an exhaust temperature value, an ambient temperature value, and a urea injection amount. The controller 126 further includes a urea deposit module that determines a urea deposit amount in response to the exhaust temperature value, the ambient temperature value, and the urea injection amount. The controller 126 further includes a deposit clearing module that initiates a desoot regeneration event in response to the urea deposit amount, where the deposit clearing module further initiates the desoot regeneration event by operating the engine at a urea decomposition exhaust temperature.

The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or software on computer readable medium, and modules may be distributed across various hardware or software components. More specific descriptions of certain embodiments of controller operations are included in the section referencing FIG. 2.

Certain operations described herein include operations to interpret one or more parameters. Interpreting, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value.

Figure 2:
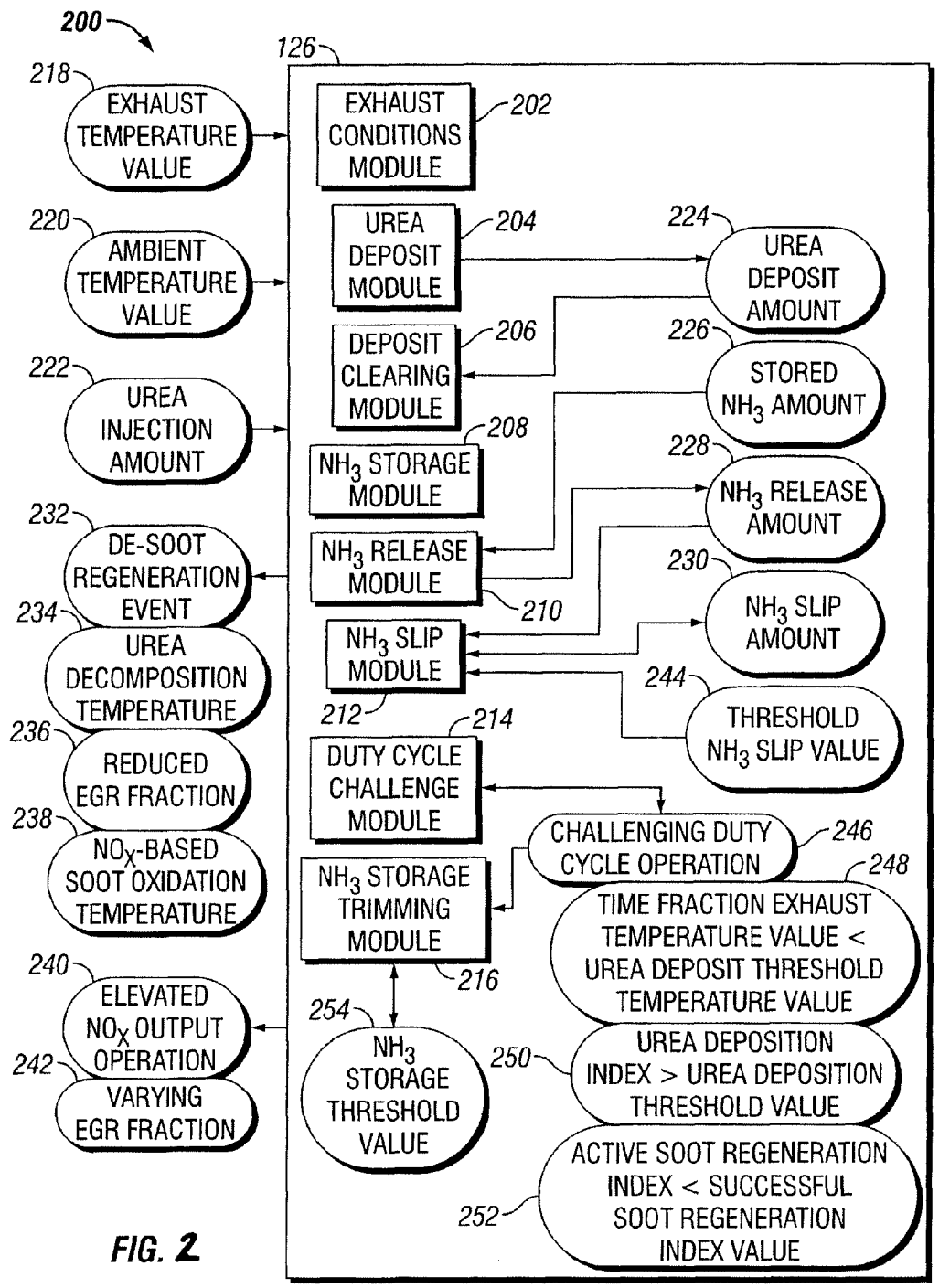
FIG. 2 is a schematic block diagram of an apparatus for NH$_3$ emissions management.

FIG. 2 is a schematic illustration of a processing subsystem 200 to limit $NH_3$ emissions in a $NO_x$ aftertreatment control system. The processing subsystem 200 includes a controller 126 having an exhaust conditions module 202 that interprets an exhaust temperature value 218, an ambient temperature value 220, and a urea injection amount 222. The controller 126 further includes a urea deposit module 204 that determines a urea deposit amount 224 in response to the exhaust temperature value 218, the ambient temperature value 220, and the urea injection amount 222. The urea deposit amount 224 is determined according to any method understood in the art. For example, injection amounts of urea and time periods wherein exhaust temperatures are too low to support evaporation and hydrolysis of urea may be accumulated to determine the urea deposit amount 224. The ambient temperature value 220 may be further utilized to estimate the heat transfer environment of the exhaust stream and determine the urea deposit amount 224. In certain embodiments, results of urea deposition rates from simple empirical sampling of exhaust temperatures, urea injection rates, and ambient temperatures may be stored within tables or equations on the controller 126 for access during run-time operations of the controller 126.

The controller 126 includes, in certain embodiments, a deposit clearing module 206 that initiates a desoot regeneration event in response to the urea deposit amount 224, for example triggering the desoot regeneration event 232 when the urea deposit amount 224 exceeds a predetermined value. In one example, the deposit clearing module 206 initiates the desoot regeneration event 232 by operating the engine at a urea decomposition exhaust temperature 234. The urea decomposition temperature 234 is a temperature high enough to support evaporation and hydrolysis of the urea deposits and injected urea. The urea decomposition temperature 234 is selectable according to the desired decomposition rate of the deposits. Exemplary urea decomposition temperatures 234 include at least 250° C., at least 200° C., and/or a temperature within a range between 250° C. and 300° C.

Certain temperature ranges within the range that support urea decomposition are also $NO_x$-based soot oxidation temperatures 238, or temperatures which support $NO_x$-based oxidation of soot particles in the soot filter. Further, the decomposing urea deposits provide a source of extra $NH_3$ in the exhaust stream. The extra $NH_3$ must be reacted in the SCR catalyst, in an $NH_3$ oxidation catalyst (and thereby the $NH_3$ is essentially wasted), or emitted to the environment. In certain embodiments, when the deposit clearing module 206 initiates the desoot regeneration event 232, including operation at the urea decomposition temperature 234, the controller 126 further operates the engine at an increased $NO_x$ emissions level. The increased $NO_x$ emissions level allows for greater flexibility in the operation of the engine to achieve the exhaust temperatures, and further provides a source of $NO_x$ to react with the soot on the soot filter ($NO_2$ oxidizes soot particles, and converts back to NO) and to react with the excess $NH_3$ being released from the decomposing urea deposits. In certain embodiments, the controller 126 includes the deposit clearing module 206 further initiating the desoot regeneration event 232 by operating the engine at a reduced EGR fraction 236. The reduced EGR fraction 236 provides an increased $NO_x$ emissions level from the engine.

In certain embodiments, the controller 126 includes an $NH_3$ storage module 208 that interprets a stored $NH_3$ amount 226 on the SCR catalyst component, and an $NH_3$ release module 210 that determines an $NH_3$ release amount 228 in response to the exhaust temperature value 218 and the stored $NH_3$ amount 226. The stored $NH_3$ amount 226 is determined according to any method understood in the art. In certain embodiments, the determination of the stored $NH_3$ amount 226 is made according to the net $NH_3$ in the exhaust stream, the maximum storage capacity of the SCR catalyst (e.g. based upon the current catalyst bed temperature, or a related temperature), and a dynamic description of the storage rate of the net $NH_3$. For example, empirical testing may indicate that the SCR catalyst stores $NH_3$ at a given rate for a given temperature, and/or that the SCR catalyst stores a given fraction of incident $NH_3$ passing therethrough at a given temperature and residence time. The empirical results of the $NH_3$ storage model may be stored on the controller 126 for access by the $NH_3$ storage module. The $NH_3$ storage model may also be determined and stored analytically as a kinetic model according to the catalyst mass, $NH_3$ concentrations, exhaust gas flow rate, and temperature of the exhaust gas and/or SCR catalyst bed. The determination of an $NH_3$ storage model is a mechanical step for one of skill in the art having the benefit of the disclosures herein.

The $NH_3$ release amount 228 may be determined according to the stored $NH_3$ amount 226 and an $NH_3$ release model. The $NH_3$ release model is a description of the $NH_3$ release amount in response to a temperature change of the SCR catalyst. The $NH_3$ storage capacity of an SCR catalyst reduces when the temperature increases, releasing stored $NH_3$, if any, as the filled SCR catalyst moves to higher temperatures. An $NH_3$ release model for a particular catalyst is readily developed from simple empirical tests, including warming a filled SCR catalyst and measuring the $NH_3$ release. Accordingly, the $NH_3$ release module 210 accesses a stored model or lookup table, and provides the $NH_3$ release amount 228 in response to the exhaust temperature value 218 and the stored $NH_3$ amount 226.

An exemplary controller 126 further includes an $NH_3$ slip module 212 that provides an elevated $NO_x$ output operation 240 in response to the $NH_3$ release amount 228, where the elevated $NO_x$ output operation 240 is configured to limit an $NH_3$ slip amount 230 to a threshold $NH_3$ slip value 230, and where the $NH_3$ slip module 212 further provides the elevated $NO_x$ output operation 240 by providing a varying EGR fraction 242 of the engine. For example, the $NH_3$ slip module determines a $NO_x$ amount for the elevated $NO_x$ output operation 240 that provides an $NH_3$ slip amount 230 consistent with the threshold $NH_3$ slip value 244 (e.g., lower than or equal to the threshold $NH_3$ slip value 244), and provides a varying EGR fraction 242 to provide the determined $NO_x$ amount.

The $NO_x$ amount for the elevated $NO_x$ output operation 240 may be determined in a feedforward operation, for example utilizing an $NH_3$ slip model using information from the stored $NH_3$ amount 226, the $NH_3$ release amount 228, and an estimated $NH_3$ slip amount 230 resulting from a given $NO_x$ amount. Additionally or alternatively, the $NO_x$ amount for the elevated $NO_x$ output operation 240 may be determined in a feedback operation, for example utilizing data from an $NH_3$ sensor (not shown) downstream of the SCR catalyst as the feedback parameter, and operating a PI, PID, or other feedback controller to control the $NH_3$ slip amount 230 in response to the threshold $NH_3$ slip value 244.

In certain embodiments, the controller 126 includes a duty cycle challenge module 214 that determines that the engine is in a challenging duty cycle operation 246, and an $NH_3$ storage trimming module 216 limits the stored $NH_3$ amount 226 below an $NH_3$ storage threshold value 254 in response to the engine being in the challenging duty cycle operation 246. The determination that the engine is in a challenging duty cycle operation 246 is performed according to any operations understood in the art.

A challenging duty cycle operation 246 includes any operations wherein the system, during nominal operations, does not provide sufficient exhaust temperatures to readily regenerate the soot filter and/or to evaporate and decompose injected urea for significant portions of the operating time. The failure to provide sufficient exhaust temperatures can include a failure to provide sufficient temperatures, a failure to provide temperatures over a sufficiently long period (e.g. long enough to complete a soot filter regeneration), and/or a failure to provide regeneration opportunities with a sufficient frequency to maintain the soot filter and/or urea deposits in a desired condition. In certain embodiments, sufficient exhaust temperature to regenerate the soot filter includes sufficient temperature to oxidize soot directly by an oxygen-based mechanism, and/or sufficient temperature to oxidized unburned hydrocarbons on an oxidation catalyst positioned upstream of the soot filter, thereby actively heating the exhaust to a higher temperature and enabling regeneration of the soot filter.

The temperatures, times, and frequency of regeneration enabling temperatures and times that are required for a particular application depend upon a number of specific parameters for a particular system, and can be readily determined by one of skill in the art contemplating a particular system. Among the factors in a system that affect the determination of a challenging duty cycle operation 246 include, without limitation, the soot filter size and substrate composition, catalyst type and loading of the soot filter (if any), the soot generation rate of the engine, the presence and capability of any auxiliary heating systems (e.g. engine temperature mechanisms, hydrocarbon in-cylinder injection, hydrocarbon dosing in the exhaust, auxiliary heaters, etc.), the catalyst type, loading, and size of any upstream oxidation catalyst, the size and heat transfer environment of a decomposition tube, and the regulated emissions levels of the system. It is a mechanical step for one of skill in the art, contemplating a particular system and having the benefit of the disclosures herein, to determine a temperature profile that indicates whether a duty cycle operation for the particular system is a challenging duty cycle operation 246.

An exemplary operation of the duty cycle challenge module 214 to determine that the engine is in a challenging duty cycle operation 246 includes determining a fraction of time 248 the exhaust temperature value is below a urea deposit threshold temperature value. Exemplary urea deposit threshold temperature values include at least 200° C. and/or at least 250° C. The fraction of time 248 required to keep the decomposition tube clear of urea deposits, or alternatively to keep the decomposition tube having a sufficiently low level of urea deposits such that a high temperature event that clears the deposits does not cause an excessive $NH_3$ slip amount 230, is readily determined empirically and can be stored on the controller 126, or be communicated to the controller 126, for access by the duty cycle challenge module 214.

Another exemplary operation of the duty cycle challenge module 214 to determine that the engine is in a challenging duty cycle operation 246 includes determining whether a urea deposition index 250 is greater than a urea deposition threshold value. The urea deposition index 250 may be determined by adding engine speed-load values indicative of exhaust temperatures wherein urea will deposit or clear from the decomposition tube, and/or by accumulating exhaust temperature values and urea injection rates to model or estimate an amount of urea that deposits for each increment of an accumulation parameter. The accumulation parameter may be time, operating time, vehicle miles, total fuel consumption, total work energy provided by the engine, or any other parameter of interest for the specific application. Exemplary and non-limiting urea deposition index 250 values include urea mass accumulated per unit of engine operating time, urea mass accumulated per unit of engine power-time produced, and/or a unitless index number that correlates with a specific urea deposition rates to the accumulation parameter.

Another exemplary operation of the duty cycle challenge module 214 to determine that the engine is in a challenging duty cycle operation 246 includes determining whether an active soot regeneration index 252 is less than a successful soot regeneration index value. The soot regeneration index 252 may be determined by adding engine speed-load values (and/or EGR fraction, air-fuel ratios, fuel timing values, etc.) indicative of exhaust temperatures wherein an attempted soot regeneration event is successful or would be successful, and/or by accumulating exhaust temperature values and engine soot production rates to model or estimate a net amount of soot that deposits for each increment of an accumulation parameter. Another exemplary soot regeneration index 252 is the excess fuel required to raise the exhaust temperature to minimum values to achieve soot regeneration per unit of the accumulation parameter. Yet another exemplary soot regeneration index 252 is the wasted fuel utilized to raise the exhaust temperature to minimum values to achieve soot regeneration per unit of the accumulation parameter, where the wasted fuel is lost due to a particular regeneration attempt being canceled due to engine operating conditions returning to a speed-load condition wherein the particular regeneration event cannot be continued or completed.

The accumulation parameter for the soot regeneration index 252 may be time, operating time, vehicle miles, total fuel consumption, total work energy provided by the engine, or any other parameter of interest for the specific application. Exemplary and non-limiting soot regeneration index 252 values include soot mass accumulated per unit of engine operating time, soot mass accumulated per unit of engine power-time produced, excess fuel required to achieve soot regeneration exhaust temperatures above a nominal case, wasted fuel accumulated per unit of the accumulation parameter, and/or a unitless index number that correlates with a consumption parameter (soot accumulation, excess fuel, and/or wasted fuel) utilized per unit of the accumulation parameter.

The operational descriptions which follow provide illustrative embodiments of performing procedures for controlling $NH_3$ emissions in a system including an engine and a $NO_x$ reduction aftertreatment system. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a computer readable medium, where the computer program product comprises instructions causing the computer to execute one or more of the operations, or to issue commands to other devices to execute one or more of the operations.

A first exemplary procedure for reducing $NH_3$ slip from an engine and aftertreatment system includes an operation to interpret an exhaust temperature value, an ambient temperature value, and a urea injection amount, and an operation to determine a urea deposit amount in response to the exhaust temperature value, the ambient temperature value, and the urea injection amount. The procedure further includes operating an engine at a urea decomposition exhaust temperature in response to the urea deposit amount exceeding a urea deposit threshold.

The exemplary procedure further includes an operation to interpret a stored $NH_3$ amount on an SCR catalyst, and an operation to determine an $NH_3$ release amount in response to the exhaust temperature value and the stored $NH_3$ amount. A further exemplary operation of the procedure includes providing an elevated $NO_x$ output operation in response to the $NH_3$ release amount,. The operation to provide the elevated $NO_x$ output operation is includes limiting an $NH_3$ slip amount to a threshold value. A still further exemplary operation includes an operation to provide the elevated $NO_x$ output operation by varying an exhaust gas recirculation (EGR) fraction.

A further exemplary procedure includes an operation to determine that a stored $NH_3$ amount on an SCR catalyst exceeds a first threshold and that a stored particulate amount on a particulate filter exceeds a second threshold. The exemplary procedure further includes performing a $NO_x$-based regeneration of the particulate filter, where the $NO_x$-based regeneration includes operating the engine at a $NO_x$-based soot oxidation temperature. The determination that the SCR catalyst exceeds the first threshold provides an indication that sufficient $NH_3$ is stored on the SCR catalyst to reduce an incoming $NO_x$ amount. The determination that the stored particulate amount on a particulate filter exceeds a second threshold provides an indication that particulates are available on the particulate filter to be oxidized by the incoming $NO_x$ amount.

In certain embodiments, the exemplary procedure further includes an operation to raise the exhaust temperature to a temperature that is less than a temperature to support oxygen-based regeneration of the particulate filter, and/or to raise the exhaust temperature to a temperature value between 250° C. and 300° C. The raised exhaust temperature supports removal of urea deposits, and supports the oxidation of particulates by $NO_x$ on the particulate filter. The temperature that supports oxygen-based regeneration of the particulate filter depends upon the composition and amount of soot/particulates on the particulate filter, the loading and composition of the catalyst (if any) on the particulate filter, and/or the concentration of oxygen in the exhaust gases. Generally, a temperature lower than about 300° C. will not support significant oxidation of the particulates by oxygen, although the required temperature to support significant oxidation of the particulates by oxygen may be even higher in certain embodiments.

In certain embodiments, the procedure includes an operation to maintain the stored $NH_3$ amount below a third threshold whenever stored particulates are available on the particulate filter. The operation to maintain the stored $NH_3$ amount below a third threshold whenever stored particulates are available on the particulate filter may be performed, in certain embodiments, in response to determining that the procedure is being performed in an application having a challenging duty cycle operation. The third threshold is selected according to an acceptable amount of $NH_3$ that would be released if a temperature rise in the SCR catalyst occurred. The third threshold may be selected further in response to a urea deposit amount in the system at the current operating time.

Yet another exemplary procedure includes an operation to maintain the stored particulate amount on the particulate filter below a fourth threshold whenever stored $NH_3$ is available on the SCR catalyst. The operation to maintain the stored particulate amount below a fourth threshold whenever stored $NH_3$ is available on the particulate filter may be performed, in certain embodiments, in response to determining that the procedure is being performed in an application having a challenging duty cycle operation The stored $NH_3$ on the SCR catalyst indicates that $NO_x$ reduction capability is present in the system, and the procedure includes providing a $NO_x$ amount to maintain the stored particulate amount at a reduced value, where the stored $NH_3$ provides for reduction of at least a portion of the $NO_x$ amount. In certain embodiments, the procedure thereby includes capability to maintain the particulate filter at a reduced particulate loading, whenever desired, whenever stored $NH_3$ is present, and/or whenever a challenging duty cycle is present.

A second exemplary procedure for controlling $NH_3$ slip from an engine and aftertreatment system includes an operation to interpret an exhaust temperature value, an ambient temperature value, an engine-out $NO_x$ amount, and a urea injection amount. The procedure further includes an operation to determine a urea deposit amount in response to the exhaust temperature value, the ambient temperature value, and the urea injection amount. The procedure further includes an operation to initiate a desoot regeneration event, including operating a system at an elevated exhaust temperature and operating an engine at an elevated engine-out $NO_x$ amount. The procedure includes the operation to initiate the desoot regeneration event in response to the urea deposit amount exceeding a urea deposit threshold.

The exemplary procedure further includes an operation to determine the engine is in a challenging duty cycle operation, and an operation to limit a stored $NH_3$ amount below an $NH_3$ storage threshold value in response to the engine being in the challenging duty cycle operation. A further exemplary procedure includes an operation to determine that the engine is in the challenging duty cycle operation by determining a fraction of time the exhaust temperature value is below a urea deposit threshold temperature value. Additionally or alternatively, the procedure includes an operation to determine the engine is in the challenging duty cycle operation by determining a urea deposition index, and determining that the urea deposition index exceeds a urea deposition threshold value.

A further exemplary procedure includes operating the engine at the elevated engine-out $NO_x$ amount by operating the engine at a reduced EGR fraction. Yet another exemplary procedure includes an operation to determine an $NH_3$ storage amount on an SCR catalyst, and operating the engine at the elevated engine-out $NO_x$ amount in response to the $NH_3$ storage amount.

As is evident from the figures and text presented above, a variety of embodiments according to the present invention are contemplated.

An exemplary set of embodiments includes a method for reducing $NH_3$ slip from an engine and aftertreatment system. The method includes interpreting an exhaust temperature value, an ambient temperature value, and a urea injection amount, and in response to the exhaust temperature value, the ambient temperature value, and the urea injection amount, the method includes determining a urea deposit amount. The method further includes operating an engine at a urea decomposition exhaust temperature in response to the urea deposit amount exceeding a urea deposit threshold.

Certain further exemplary embodiments of the method are described following. An exemplary method includes interpreting a stored $NH_3$ amount on an SCR catalyst, and determining an $NH_3$ release amount in response to the exhaust temperature value and the stored $NH_3$ amount. A further exemplary method includes providing an elevated $NO_x$ output operation in response to the $NH_3$ release amount, where the elevated $NO_x$ output operation is configured to limit an $NH_3$ slip amount to a threshold value. A still further exemplary method includes providing the elevated $NO_x$ output operation by varying an exhaust gas recirculation (EGR) fraction.

Another exemplary method includes determining that a stored $NH_3$ amount on an SCR catalyst exceeds a first threshold, that a stored particulate amount on a particulate filter exceeds a second threshold, and performing a $NO_x$-based regeneration of the particulate filter, where the $NO_x$-based regeneration includes operating the engine at a $NO_x$-based soot oxidation temperature. A further exemplary method includes performing the $NO_x$-based regeneration of the particulate filter by operating the engine at an elevated raising an exhaust temperature of the engine to a temperature that evaporates the urea deposit amount. Alternatively or additionally, the method includes raising the exhaust temperature to a temperature that is less than a temperature to support oxygen-based regeneration of the particulate filter, and/or raising the exhaust temperature to a temperature value between 250° C. and 300° C.

In certain embodiments, the method includes maintaining the stored $NH_3$ amount below a third threshold whenever stored particulates are available on the particulate filter. Another exemplary method includes maintaining the stored particulate amount on the particulate filter below a fourth threshold whenever stored $NH_3$ is available on the SCR catalyst.

Yet another exemplary set of embodiments includes a method for controlling $NH_3$ slip from an engine and aftertreatment system. The method includes interpreting an exhaust temperature value, an ambient temperature value, an engine-out $NO_x$ amount, and a urea injection amount. The method further includes determining a urea deposit amount in response to the exhaust temperature value, the ambient temperature value, and the urea injection amount. The method further initiating a desoot regeneration event that includes operating a system at an elevated exhaust temperature and operating an engine at an elevated engine-out $NO_x$ amount, where initiating the desoot regeneration event is in response to the urea deposit amount exceeding a urea deposit threshold.

Certain further exemplary embodiments of the method are described following. An exemplary method includes determining that the engine is in a challenging duty cycle operation, and limiting a stored $NH_3$ amount below an $NH_3$ storage threshold value in response to the engine being in the challenging duty cycle operation. A further exemplary method includes determining that the engine is in the challenging duty cycle operation by determining a fraction of time the exhaust temperature value is below a urea deposit threshold temperature value. Additionally or alternatively, the method includes determining that the engine is in the challenging duty cycle operation by determining a urea deposition index, and determining that the urea deposition index exceeds a urea deposition threshold value.

Another exemplary method includes operating the engine at the elevated engine-out $NO_x$ amount by operating the engine at a reduced EGR fraction. Yet another exemplary method includes determining an $NH_3$ storage amount on an SCR catalyst, and further operating the engine at the elevated engine-out $NO_x$ amount in response to the $NH_3$ storage amount.

Yet another exemplary set of embodiments is an apparatus for controlling $NH_3$ slip from an engine and aftertreatment system. The apparatus includes an exhaust conditions module that interprets an exhaust temperature value, an ambient temperature value, and a urea injection amount, and a urea deposit module that determines a urea deposit amount in response to the exhaust temperature value, the ambient temperature value, and the urea injection amount. The apparatus includes a deposit clearing module that initiates a desoot regeneration event in response to the urea deposit amount, where the deposit clearing module further initiates the desoot regeneration event by operating an engine at a urea decomposition exhaust temperature.

Certain further exemplary embodiments of the apparatus are described following. A exemplary apparatus includes the deposit clearing module further initiating the desoot regeneration event by operating the engine at an elevated $NO_x$ output condition. A further exemplary apparatus includes the deposit clearing module further operating the engine at the elevated $NO_x$ output condition by operating the engine at a reduced EGR fraction.

Another exemplary apparatus includes an $NH_3$ storage module that interprets a stored $NH_3$ amount on an SCR catalyst, and an $NH_3$ release module that determines an $NH_3$ release amount in response to the exhaust temperature value and the stored $NH_3$ amount. A further exemplary apparatus includes an $NH_3$ slip module that provides an elevated $NO_x$ output operation in response to the $NH_3$ release amount, where the elevated $NO_x$ output operation limits an $NH_3$ slip amount to a threshold value. A still further exemplary apparatus includes the $NH_3$ slip module further providing the elevated $NO_x$ output operation by varying an EGR fraction of the engine.

Yet another exemplary set of embodiments includes a system having an internal combustion engine producing an exhaust gas, an aftertreatment system receiving the exhaust gas, where the aftertreatment system includes a particulate filter positioned upstream of an SCR catalyst component, and a urea injector operatively coupled to the aftertreatment system at a position upstream of the SCR catalyst component. The system further includes a controller having a number of modules structured to functionally execute operations to limit $NH_3$ slip from the system.

The controller includes an exhaust conditions module that interprets an exhaust temperature value, an ambient temperature value, and a urea injection amount. The controller further includes a urea deposit module that determines a urea deposit amount in response to the exhaust temperature value, the ambient temperature value, and the urea injection amount, and deposit clearing module that initiates a desoot regeneration event in response to the urea deposit amount, where the deposit clearing module further initiates the desoot regeneration event by operating the engine at a urea decomposition exhaust temperature.

Certain further exemplary embodiments of the system are described following. An exemplary system includes the deposit clearing module further initiating the desoot regeneration event by operating the engine at a reduced EGR fraction. Another exemplary system includes an $NH_3$ storage module that interprets a stored $NH_3$ amount on the SCR catalyst component, and an $NH_3$ release module that determines an $NH_3$ release amount in response to the exhaust temperature value and the stored $NH_3$ amount. A further exemplary system includes an $NH_3$ slip module that provides an elevated $NO_x$ output operation in response to the $NH_3$ release amount, where the elevated $NO_x$ output operation is configured to limit an $NH_3$ slip amount to a threshold value, and where the $NH_3$ slip module further provides the elevated $NO_x$ output operation by varying an EGR fraction of the engine.

An exemplary system further includes the urea decomposition exhaust temperature being a temperature value of at least 250° C. In certain embodiments, the controller includes a duty cycle challenge module that determines that the engine is in a challenging duty cycle operation, and an $NH_3$ storage trimming module limits the stored $NH_3$ amount below an $NH_3$ storage threshold value in response to the engine being in the challenging duty cycle operation. In certain further embodiments, the duty cycle challenge module further determines that the engine is in the challenging duty cycle operation by determining a fraction of time the exhaust temperature value is below a urea deposit threshold temperature value. Another exemplary system includes the duty cycle challenge module further determining that the engine is in the challenging duty cycle operation by determining a urea deposition index, and determining that the urea deposition index exceeds a urea deposition threshold value. An exemplary system further includes the duty cycle challenge module determining that the engine is in the challenging duty cycle operation by determining an active soot regeneration index, and determining that the active soot regeneration index is below a successful soot regeneration index value.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
   interpreting an exhaust temperature value, an ambient temperature value, and a urea injection amount;
   in response to the exhaust temperature value, the ambient temperature value, and the urea injection amount, determining a urea deposit amount;
   interpreting a stored $NH_3$ amount on an SCR catalyst;
   determining an $NH_3$ release amount in response to the exhaust temperature value and the stored $NH_3$ amount; and
   in response to the urea deposit amount exceeding a urea deposit threshold, initiating a desoot regeneration event that operates an engine to produce an exhaust temperature based on the urea deposit amount and the $NH_3$ release amount.

2. The method of claim 1, wherein the engine is operated to provide an elevated $NO_x$ amount based on an elevated $NO_x$ output operation in response to the $NH_3$ release amount, wherein the elevated $NO_x$ output operation is configured to limit an $NH_3$ slip amount to a threshold value.

3. The method of claim 2, wherein the elevated $NO_x$ output operation comprises varying an exhaust gas recirculation (EGR) fraction to operate the engine to provide the elevated $NO_x$ amount.

4. The method of claim 1, further comprising determining that the stored $NH_3$ amount on the SCR catalyst exceeds a first threshold and that a stored particulate amount on a particulate filter exceeds a second threshold, and
   in response to the stored $NH_3$ amount on the SCR catalyst exceeding the first threshold and the stored particulate amount on the particulate filter exceeding the second threshold, operating the engine to produce an exhaust temperature at a $NO_x$-based soot oxidation temperature.

5. The method of claim 1, wherein the exhaust temperature is a temperature value between 250° C. and 300° C.

6. A method, comprising:
   interpreting an exhaust temperature value, an ambient temperature value, an engine-out $NO_x$ amount, and a urea injection amount;
   in response to the exhaust temperature value, the ambient temperature value, and the urea injection amount, determining a urea deposit amount; and
   in response to the urea deposit amount exceeding a urea deposit threshold, initiating a desoot regeneration event that operates an engine to produce an elevated exhaust temperature with an elevated engine-out $NO_x$ amount based on the urea deposit amount and the engine-out $NO_x$ amount.

7. The method of claim 6, further comprising determining that the engine is in a challenging duty cycle operation, and limiting a stored $NH_3$ amount below an $NH_3$ storage threshold value in response to the engine being in the challenging duty cycle operation.

8. The method of claim 6, wherein operating the engine to produce the elevated engine exhaust temperature with the elevated engine-out $NO_x$ amount comprises operating the engine at a reduced EGR fraction.

9. The method of claim 6, further comprising determining an $NH_3$ storage amount on an SCR catalyst, wherein the engine is operated to produce the elevated exhaust temperature with the elevated engine-out $NO_x$ amount further based on the $NH_3$ storage amount.

10. An apparatus comprising:
    an exhaust conditions module configured to interpret an exhaust temperature value, an ambient temperature value, and a urea injection amount;
    a urea deposit module configured to determine a urea deposit amount based on the exhaust temperature value, the ambient temperature value, and the urea injection amount;
    an $NH_3$ storage module configured to interpret a stored $NH_3$ amount on an SCR catalyst, and an $NH_3$ release module structured to determine an $NH_3$ release amount in response to the exhaust temperature value and the stored $NH_3$ amount; and
    a deposit clearing module configured to initiate a desoot regeneration event based on the urea deposit amount, wherein the desoot regeneration event that operates an engine to produce a urea decomposition exhaust temperature based on the urea deposit amount and the $NH_3$ release amount.

11. The apparatus of claim 10, wherein the deposit clearing module is further configured to initiate the desoot regeneration event that operates the engine to produce an elevated $NO_x$ output amount.

12. The apparatus of claim 11, wherein operating the engine to produce the elevated $NO_x$ output amount comprises operating the engine at a reduced EGR fraction.

13. The apparatus of claim 10, further comprising an $NH_3$ slip module configured to determine an elevated $NO_x$ output amount in response to the $NH_3$ release amount, wherein the determined elevated $NO_x$ output amount limits an $NH_3$ slip amount to a threshold value.

14. The apparatus of claim 13, wherein the $NH_3$ slip module is further configured to vary an EGR fraction of the engine to generate the determined elevated $NO_x$ output amount.

15. A system comprising:
an internal combustion engine producing an exhaust gas;
an aftertreatment system receiving the exhaust gas, the aftertreatment system including a particulate filter positioned upstream of an SCR catalyst component;
a urea injector operatively coupled to the aftertreatment system at a position upstream of the SCR catalyst component; and
a controller, comprising:
an exhaust conditions module configured to interpret an exhaust temperature value, an ambient temperature value, and a urea injection amount;
a urea deposit module configured to determine a urea deposit amount in response to the exhaust temperature value, the ambient temperature value, and the urea injection amount;
a duty cycle challenge module structured configured to determine when the internal combustion engine is in a challenging duty cycle operation;
a $NH_3$ storage trimming module configured to limit a stored $NH_3$ amount for the SCR catalyst below a $NH_3$ storage threshold value in response to the engine being in the challenging duty cycle operation; and
a deposit clearing module configured to initiate a desoot regeneration event in response to the urea deposit amount, wherein the desoot regeneration event operates the engine to produce a urea decomposition exhaust temperature based on the urea deposit amount and the stored $NH_3$ amount.

16. The system of claim 15, wherein the desoot regeneration event operates the engine at a reduced EGR fraction.

17. The system of claim 15, further comprising an $NH_3$ storage module configured to interpret the stored $NH_3$ amount on the SCR catalyst component, and an $NH_3$ release module configured to determine an $NH_3$ release amount in response to the exhaust temperature value and the stored $NH_3$ amount.

18. The system of claim 17, further comprising an $NH_3$ slip module configured to determine an elevated $NO_x$ output amount based on the $NH_3$ release amount, wherein the elevated $NO_x$ output amount limits an $NH_3$ slip amount to a threshold value, and wherein the $NH_3$ slip module is further configured to vary an EGR fraction of the engine to produce the elevated $NO_x$ output amount.

19. The system of claim 15, wherein the urea decomposition exhaust temperature comprises a temperature value of at least 250° C.

20. The method of claim 7, wherein the engine is determined to be in a challenging duty cycle operation based on a fraction of time the exhaust temperature value is below a urea deposit threshold temperature value.

21. The method of claim 7, wherein the engine is determined to be in a challenging duty cycle operation based on a urea deposit index value being greater than the urea deposit threshold.

22. The method of claim 7, wherein the engine is determined to be in a challenging duty cycle operation based on an active soot regeneration index value being greater than a successful soot regeneration index value.

23. The system of claim 15, wherein the internal combustion engine is determined to be in a challenging duty cycle operation based on a fraction of time the exhaust temperature value is below a urea deposit threshold temperature value.

24. The system of claim 15, wherein the internal combustion engine is determined to be in a challenging duty cycle operation based on a urea deposit index value being greater than the urea deposit threshold.

25. The system of claim 15, wherein the internal combustion engine is determined to be in a challenging duty cycle operation based on an active soot regeneration index value being greater than a successful soot regeneration index value.

* * * * *